United States Patent [19]
McCallum

[11] Patent Number: 6,119,824
[45] Date of Patent: Sep. 19, 2000

[54] BRAKED MECHANICAL JOINT ASSEMBLY

[76] Inventor: Dennis L. McCallum, 38940 Jasper-Lowell Rd., Fall Creek, Oreg. 97438

[21] Appl. No.: 09/087,719

[22] Filed: May 29, 1998

[51] Int. Cl.$^7$ ..................................................... F16D 55/00

[52] U.S. Cl. ........................................... 188/83; 188/72.7

[58] Field of Search ................................... 188/82.84, 83, 188/72.2, 72.7, 72.6, 71.1, 381, 322.5, 293; 403/57, 74, 334, 113, 120; 267/205, 208, 136, 141.1, 141.3, 141.7, 201

[56] References Cited

U.S. PATENT DOCUMENTS

| | | | |
|---|---|---|---|
| 1,774,094 | 8/1930 | Gulick | 267/205 |
| 2,742,107 | 4/1956 | DuBois | 188/73.2 |
| 4,616,948 | 10/1986 | Jelfs | 403/5 |
| 4,723,646 | 2/1988 | Scheneman, Jr. | 188/83 |
| 4,810,020 | 3/1989 | Powell | 294/119.4 |
| 4,840,083 | 6/1989 | Hagan et al. | 74/574 |
| 5,451,087 | 9/1995 | Beaulieu | 188/83 |
| 5,487,452 | 1/1996 | Moinard et al. | 188/72.7 |
| 5,582,276 | 12/1996 | Berteau | 188/82.84 |
| 5,601,161 | 2/1997 | Brigden | 188/83 |
| 5,605,208 | 2/1997 | Friedrichsen et al. | 188/381 |
| 5,685,661 | 11/1997 | Marka et al. | 403/120 |
| 5,713,688 | 2/1998 | McCallum . | |
| 5,779,383 | 7/1998 | McCallum . | |

*Primary Examiner*—Robert J. Oberleitner
*Assistant Examiner*—Tom Williams
*Attorney, Agent, or Firm*—David S. Alavi

[57] ABSTRACT

A braked mechanical joint assembly is disclosed herein comprising: a) a first brake member; b) a second brake member rotatable relative to the first brake member; c) a friction member positioned between the first and second brake members; (d) means for pushing the first and second brake members together, thereby frictionally engaging them with the friction member so as to oppose relative rotation of the brake members. A resting braking torque is set at the resting position of the joint by initial adjustment of the pushing means.

A larger braking torque is produced at other joint positions by providing the joint assembly with a bearing assembly for varying the braking torque with movement of the joint. The bearing assembly may comprise mating bearing grooves or raceways provided on pushing means and at least one of the brake members. The depth of each groove varies over its course, having a deepest segment corresponding to each of several bearings (ball or roller bearings) in the groove. When the joint is in its resting position, a bearing is received in each of these deepest segments, the pushing force exerted by the pushing means is at its minimum (i.e., rest position) value, and the braking torque is at its minimum value. As the joint moves away from its resting position, relative rotation of the grooves of the brake member and pushing means causes the bearings to roll out of the deepest segments of the grooves and into shallower segments of the grooves. As the bearings roll into shallower portions of the groove, the cam action of the bearings in the grooves results in increasing pushing force exerted by the pushing means and therefore increased braking torque. By tailoring the depth profile of the groove as a function of joint position, any desired pushing force/brake torque vs. joint position behavior can be achieved.

13 Claims, 5 Drawing Sheets

BRAKED MECHANICAL JOINT ASSEMBLY

FIELD OF THE INVENTION

The field of the present invention relates to mechanical joints incorporating braking mechanisms. In particular, a mechanical joint is described producing varying braking torque in response to motion of the joint.

BACKGROUND

A mechanical joint assembly is an assembly which allows two members to be mechanically joined but allows rotation of one member with respect to the other about one or more rotation axes. A universal joint is a mechanical joint assembly providing rotation about two substantially orthogonal axes. Such a joint is useful in applications in which two members must be mechanically joined but must be allowed to assume an arbitrary relative angle.

In some applications it is desirable for the motion of the moving members about the universal joint to be restricted or damped by braking. For example, such a braked universal joint is useful in situations wherein a first joined member is a boom with a second joined member suspended therefrom being some load carrying means, wherein motion of the load carrying means must be restricted, particularly when not loaded. One particular application of a braked universal joint is suspension of a grappler from a boom of a logging skidder. Several previous designs for a braked universal joint used in this way (also referred to as a swivel link) are described in U.S. Pat. Nos. 4,335,914; 4,417,759; 4,573,728; 4,679,839; 4,715,641; 5,110,169; 5,451,087; and 5,601,161, each of said patents being incorporated by reference as if fully set forth herein. A much improved design for a swivel link incorporating frusto-conical surfaces for braking and load-bearing is disclosed in U.S. Pat. No. 5,713,688 issued to the applicant of the present application, and co-pending application Ser. No. 08/909,552 now (U.S. Pat. No. 5,779,383) filed in the name of the applicant of the present application, both of said patent and said application being incorporated by reference as if fully set forth herein. The design and construction of swivel link assemblies, many drawbacks of previous swivel link designs, and improvements resulting from the use of frusto-conical braking and load-bearing surfaces are fully disclosed therein, and need not be reiterated herein.

A primary figure-of-merit for a swivel link is the number of hours of use in the field before replacement of the friction members of the joint (friction discs in older designs, friction cones in the frusto-conical design). Anything that reduces wear of the friction members (and therefore reduces concomitant down time, maintenance time, and maintenance costs) is highly desirable.

During use of a swivel link, and many other braked mechanical joints, it is often the case that small motions about the joint are insignificant and can be tolerated, while larger motions are undesirable and must be prevented (for example, to prevent injury or equipment damage). However, previous joints provide a constant braking torque independent of the amount of motion which has occurred. Reduction of the braking torque for small motions and/or motions near a rest position would reduce unnecessary wear on the friction members, "saving" the friction members for suppression of larger amplitude motions and/or motions far from the rest position.

It is therefore desirable to provide a braked mechanical joint assembly in which a relatively smaller braking torque is applied during small amplitude motions and/or motions near a rest position of the joint, while a relatively larger braking torque is applied during large amplitude motions and/or motions far from the rest position of the joint. It may also be desirable to provide a braked mechanical joint assembly in which the braking torque may vary with joint position and/or motion in an arbitrary fashion.

SUMMARY

Certain aspects of the present invention may overcome one or more aforementioned drawbacks of the previous art and/or advance the state-of-the-art of braked mechanical joint assemblies, and in addition may meet one or more of the following objects:

- To provide a braked mechanical joint assembly wherein the braking torque varies with motion of the joint;
- To provide a braked mechanical joint assembly wherein the braking torque increases as the joint moves farther from its rest position;
- To provide a braked mechanical joint assembly wherein the braking torque decreases as the joint moves closer to its rest position;
- To provide a braked mechanical joint assembly which allows small amplitude motion about a resting joint position;
- To provide a braked mechanical joint assembly wherein the braking torque is reduced after a motion is arrested by the larger braking torque produced by that motion;
- To provide a braked mechanical joint assembly wherein the wear of friction members is reduced;
- To provide a braked mechanical joint assembly wherein the wear of friction members is reduced during motion of the joint near its rest position;
- To provide a braked mechanical joint assembly with a longer useful field life than previous joint assemblies; and
- To provide a braked mechanical joint assembly with reduced maintenance requirements.

One or more of the foregoing objects may be achieved in the present invention by a braked mechanical joint assembly comprising: a) a first brake member; b) a second brake member rotatable relative to the first brake member; c) a friction member positioned between the first and second brake members; (d) means for pushing the first and second brake members together, thereby frictionally engaging them with the friction member so as to oppose relative rotation of the brake members. The friction member may be integral to one or both of the brake members. A rest braking torque is set at the resting position of the joint by initial adjustment of the pushing means.

A larger braking torque is produced at other joint positions by providing the joint assembly with a bearing assembly for varying the braking torque with movement of the joint. The bearing assembly may comprise mating bearing grooves or raceways provided on pushing means and at least one of the brake members. The depth of each groove varies over its course, having a deepest segment corresponding to each of several bearings (ball or roller bearings) in the groove. When the joint is in its resting position, a bearing is received in each of these deepest segments, the pushing force exerted by the pushing means is at its minimum (i.e., rest position) value, and the braking torque is at its minimum value. As the joint moves away from its resting position, relative rotation of the grooves of the brake member and pushing means causes the bearings to roll out of the deepest segments of the grooves and into shallower segments of the grooves. As the bearings roll into shallower portions of the groove, the cam action of the bearings in the grooves results in increasing pushing force exerted by the pushing means and therefore increased braking torque. By tailoring the depth profile of the groove as a function of joint position, any desired pushing force/brake torque vs. joint position behavior can be achieved.

Additional objects and advantages of the present invention may become apparent upon referring to the preferred and alternative embodiments of the present invention as illustrated in the drawings and described in the following written description and/or claims.

DETAILED DESCRIPTION OF PREFERRED AND ALTERNATIVE EMBODIMENTS

For purposes of the present written description and/or claims, a "rolling bearing" shall denote any bearing in rolling engagement with two or more members moving relative to one another, and in particular shall be construed to encompass substantially spherical bearings (i.e., ball bearings), substantially cylindrical bearings (i.e., roller bearings), and substantially frusto-conical bearings, but shall not be limited to these bearings.

For purposes of the present written description and/or claims, exemplary joints are shown having two substantially orthogonal rotation axes, with the subject matter of the present invention employed in one axis. However, the subject matter of the present invention is equally applicable to joints having one, two, three, or more axes. Furthermore, the subject matter of the present invention may be employed in any number of the axes of a joint assembly, and in particular may be employed in only one axis, two axes, or more axes, up to the total number of axes in a joint assembly.

Figure 1:
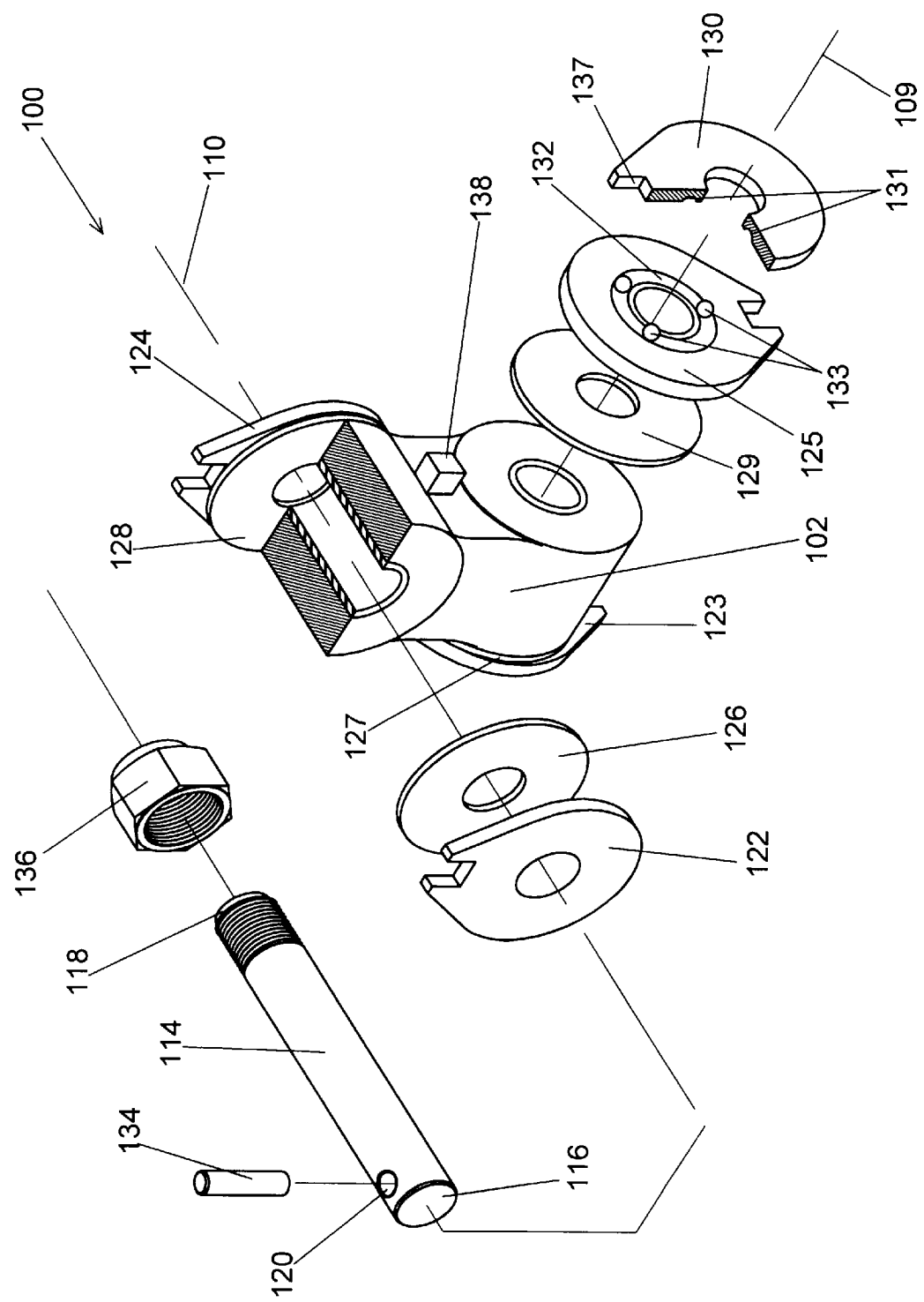
FIG. 1 shows an exploded view of a joint assembly according to the present invention employing brake discs, friction discs, a threaded shaft, and a threaded nut.

FIG. 1 shows an exploded view of an embodiment of a two-axis joint assembly 100 according to the present invention. Joint 100 comprises: a central joint body 102 having four substantially orthogonal faces and two bores defining two substantially orthogonal rotation axes 109 and 110; and two rotation assemblies, each rotation assembly being associated with one of the axes 109 and 110 and substantially nonrotatably engaging one of the two joined members. One rotation assembly is associated with axis 110 and comprises: a shaft 114 positioned within and extending beyond the ends of one of the bores in joint body 102 and having a first end 116 with a transverse hole 120 therethrough and a threaded second end 118; a locking pin 134 positioned within and extending from hole 120; a first friction disc 126 positioned around shaft 114 and against joint body 102; a second friction disc 128 positioned around shaft 114 and against joint body 102; a first brake disc 122 positioned around shaft 114 and against friction disc 126 and adapted to substantially nonrotatably engage the first joined member; a second brake disc 124 positioned around shaft 114 and against friction disc 128 and adapted to substantially nonrotatably engage the first joined member; and a nut 136 threadedly engaged onto end 118 of shaft 114 and tightened, thereby compressing friction discs 126 and 128 and joint body 102 between brake discs 122 and 124. A second rotation assembly is associated with axis 109, has substantially the same structure as the first rotation assembly, and substantially nonrotatably engages the second joined member. Brake discs 123 and 125 and friction discs 127 and 129 are shown, but the corresponding threaded shaft, pin, and nut have been omitted for clarity.

Figure 2A:
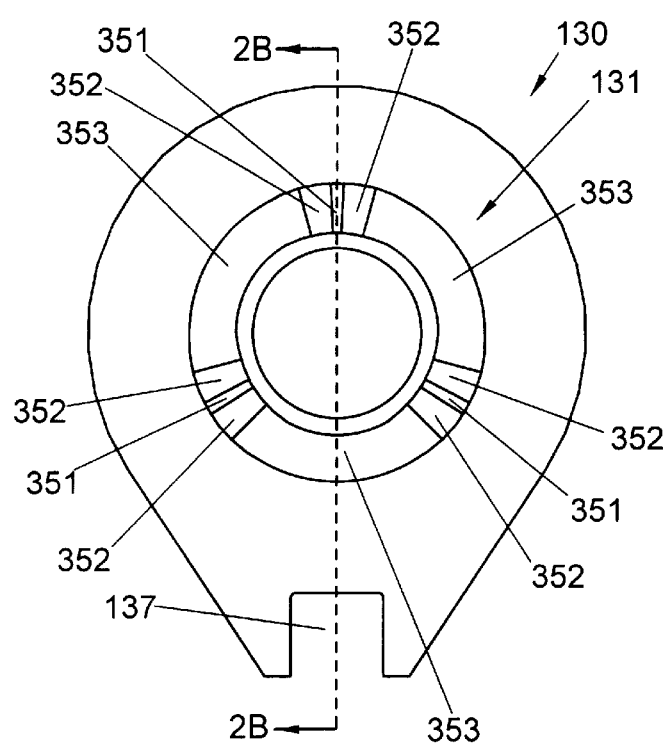
FIGS. 2A and 2B show end and cross-sectional views, respectively, of a bearing disc according to the present invention.
Figure 2B:
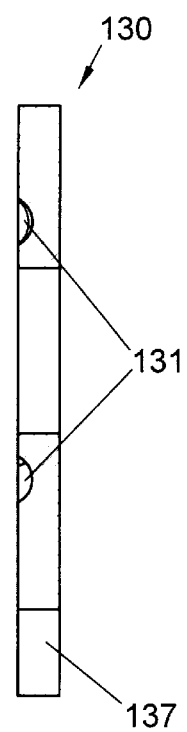
Figure 3:
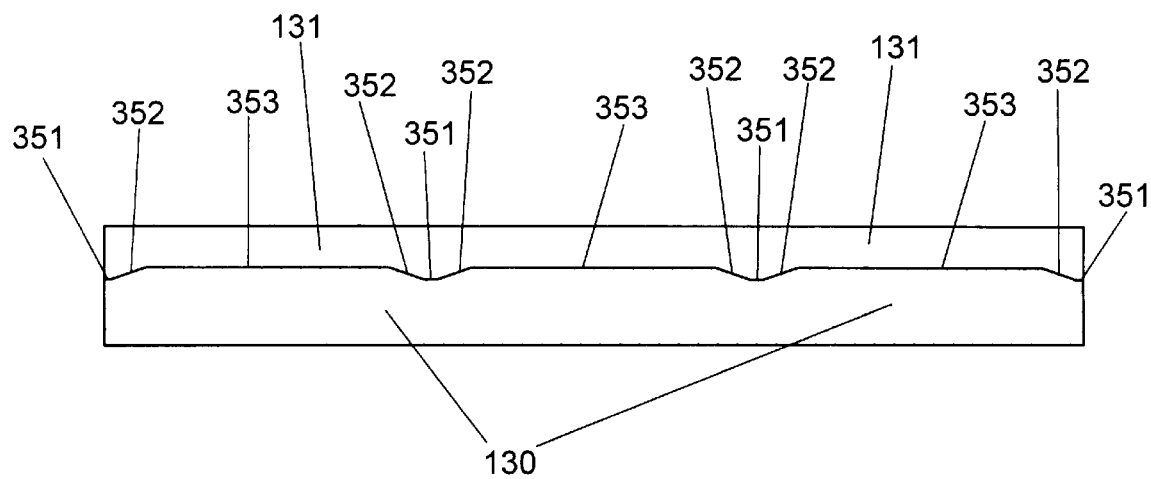
FIG. 3 shows a linearized circumferential depth profile of a circular bearing groove according to the present invention.

Brake disc 125 is shown with bearing groove 132 and bearings 133 therein. Bearing disc 130 (also referred to as an actuator disc) is shown partly cut away to reveal mating bearing groove 131. When the joint is assembled, bearing grooves 131 and 132 line up and retain bearings 133 between them. During rotation about axis 109, bearing disc 130 rotates with joint body 102 due to the engagement of lug 138 in slot 137 in bearing disc 130, while brake disc 125 rotates independently of joint body 102. The resulting relative rotation of brake disc 125 and bearing disc 130 causes bearings 133 to roll within bearing grooves 131 and 132. At least one, and preferably both, of bearing grooves 131 and 132 are machined with a varying depth profile, as shown in FIGS. 2 and 3. FIGS. 2A and 2B show end and cross-sectional views, respectively, of bearing disc 130, while FIG. 3 shows a linearized circumferential depth profile of substantially circular bearing groove 131. Preferably, the bearing groove is machined with a deep segment corresponding to each of the bearings 133 and substantially uniformly spaced around the substantially circular bearing groove. The deep segments may be machined in the form of a flat-bottomed V-shape (in a circumferential direction), with a short flat central portion 351 and lateral upwardly sloped portions 352. Between the deep segments the bearing grooves may have intervening segments 353 of a substantially constant depth. Groove 132 on brake disc 125 may have a circumferential depth profile substantially similar to that depicted in FIGS. 2 and 3 for groove 131.

When the joint assembly is used, the nut is initially tightened to compress bearing disc 130, brake disc 125, friction disc 129, joint body 102, friction disc 127, and brake disc 123, thereby generating a resting braking torque opposing rotation of brake discs 123 and 127 relative to joint body 102 and bearing disc 130. Without the varying depth profile of at least one of bearing grooves 131 and 132, the braking torque would be substantially constant regardless of the rotation about axis 109. With the groove profile depicted in FIGS. 2 and 3, however, the braking torque varies with rotation of the joint. The joint is in a resting position when the bearings are in the deep segments of the bearing grooves. This resting position remains substantially fixed during movement of the joint assembly since bearing disc 130 is constrained to rotate along with joint body 102. The nut is initially tightened to produce the desired amount of compression of the bearing disc, brake discs, friction discs, and joint, and therefore the desired amount of resting braking torque for small rotations from the resting position. When the joint rotates beyond the angular range defined by the central flat portions 351 of each deep segment, each bearing 133 rolls onto a lateral upwardly sloped portion 352, thereby further compressing the bearing disc, brake discs, friction discs, and joint body and increasing the braking torque. When each bearing 133 has rolled onto an intervening segment 353, the maximum braking torque is achieved. Therefore, the largest braking torque, and hence the heaviest wear on the friction discs and other components of the joint, only occurs for rotations larger than the angular range defined by the deep segments of the bearing grooves. Without departing from inventive concepts disclosed and/or claimed herein, any circumferential groove depth profile may be employed which results in relatively less braking torque in a joint resting position and relatively more braking torque for rotation of the is joint substantially away from the resting position.

Figure 4:
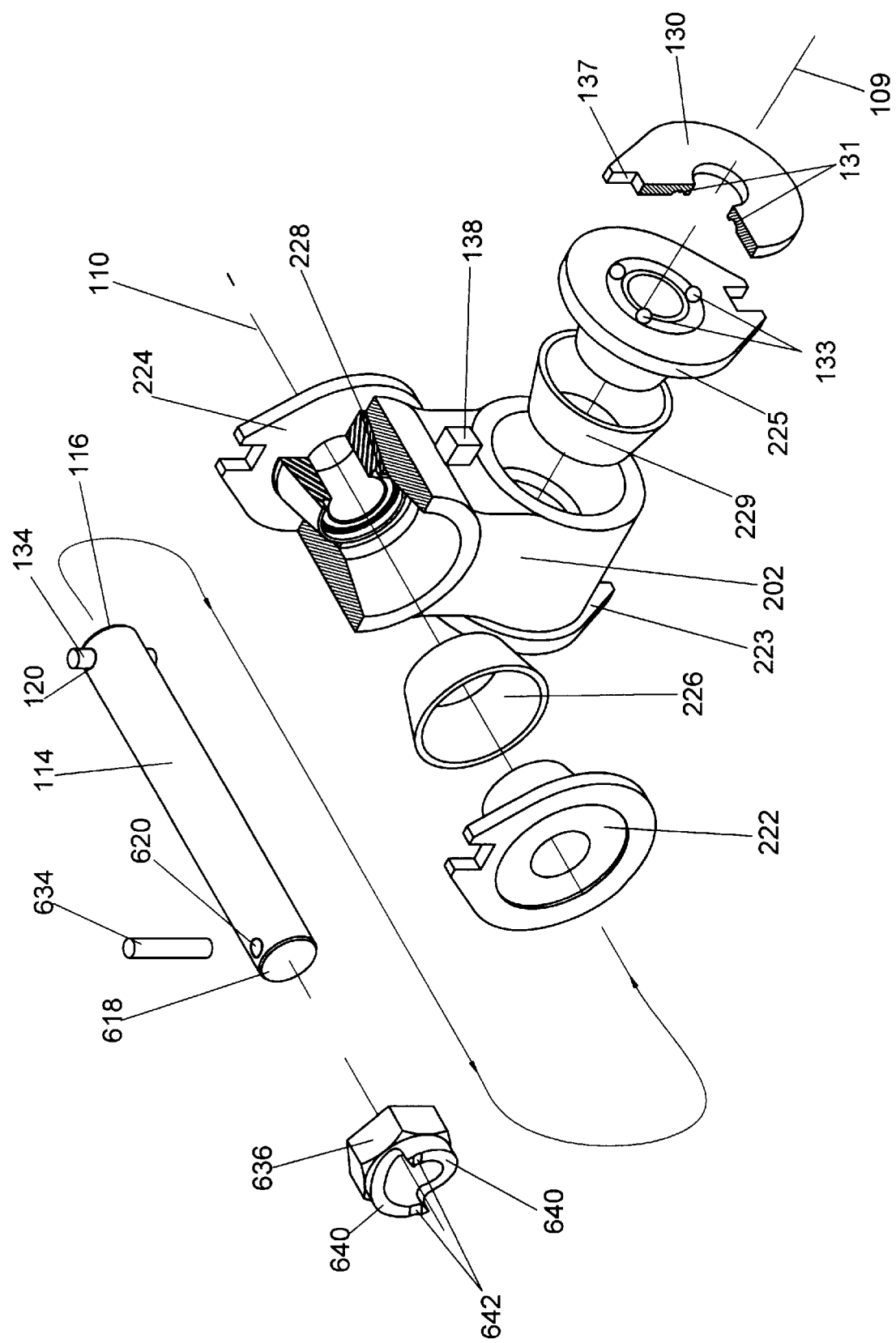
FIG. 4 shows an exploded view of a joint assembly according to the present invention employing brake cones, friction cones, and a cam.
Figure 5B:
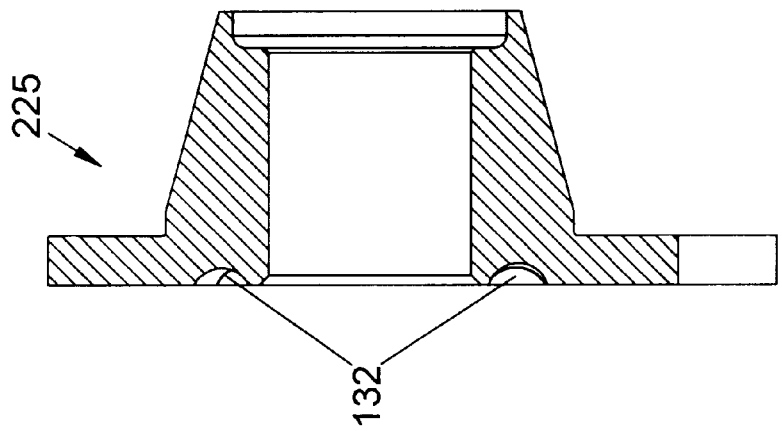
FIGS. 5A and 5B show end and cross-sectional views, respectively, of a brake cone with a bearing groove according to the present invention.
Figure 5A:
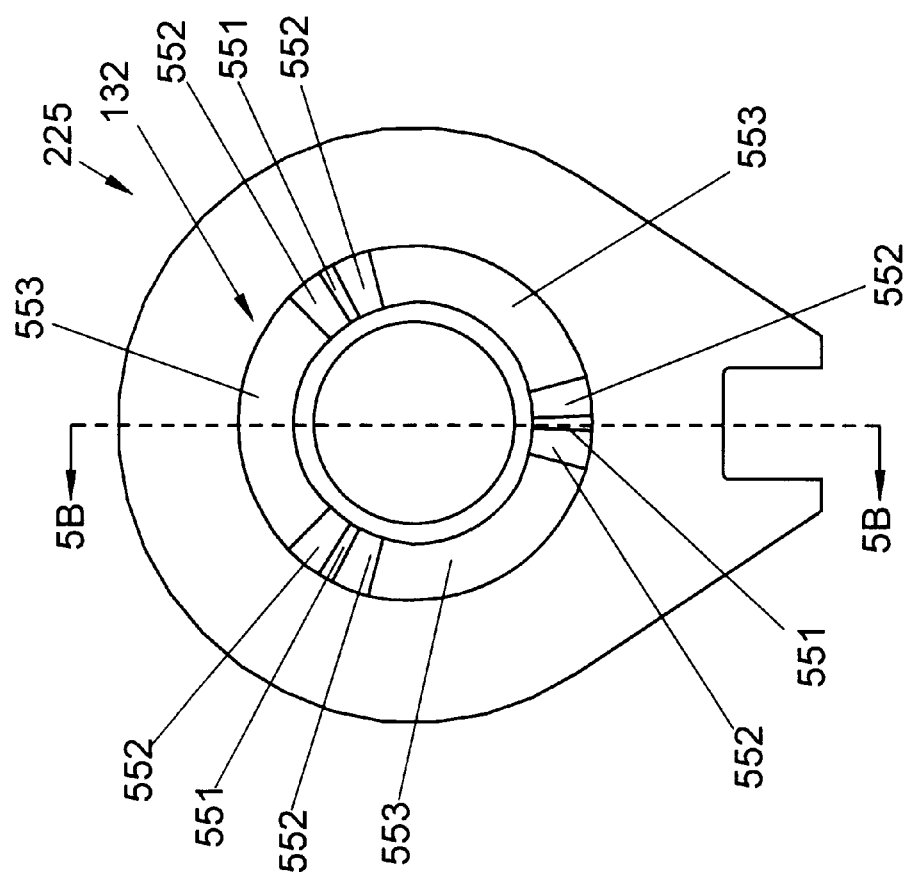

Another embodiment of the present invention employing a cam an frusto-conical brake and friction members is shown in the exploded view of FIG. 4. Construction and operation of this joint are similar in many ways to that shown in FIGS. 1, 2, and 3. In place of brake discs 122–125 are brake cones 222–225. In place of friction discs 126–129 are friction cones 226–229. The bores in joint body 202 each comprise two frusto-conical sections having their bases on the faces of joint body 202. In place of the threaded second end of shaft 114 is second end 618 with transverse hole 620 therethrough. Cam-engaging pin 634 is positioned within hole 620. In place of nut 136, cam 636 is positioned on shaft 114 engaged with cam-engaging pin 634 by positioning pin 634 against sloped surfaces 640 of cam 636. Rotation of cam 636 about shaft 114 pushes cam 636 toward the brake cone, thereby compressing the bearing disc, brake cones, and friction cones against the bores in joint body 102. The configuration and operation of bearing disc 130, bearing grooves 131 and 132, bearings 133, slot 137, and lug 138 are substantially as described hereinabove. FIGS. 5A and 5B show end and cross-sectional views, respectively, of brake cone 225 with bearing groove 132. In a manner similar to that depicted in FIGS. 2 and 3 for groove 131, groove 132 may comprise deep segments each having a central flat portion 551 and lateral upwardly sloped portions 552, with intervening segments 553 having substantially constant depth. The various advantages and alternative embodiments of joints employing frusto-conical brake members and friction members have been disclosed extensively in U.S. Pat. No. 5,713,688 and application Ser. No. 08/909,552, (now U.S. Pat. No. 5,779,383) incorporated by reference hereinabove.

Figure 6:
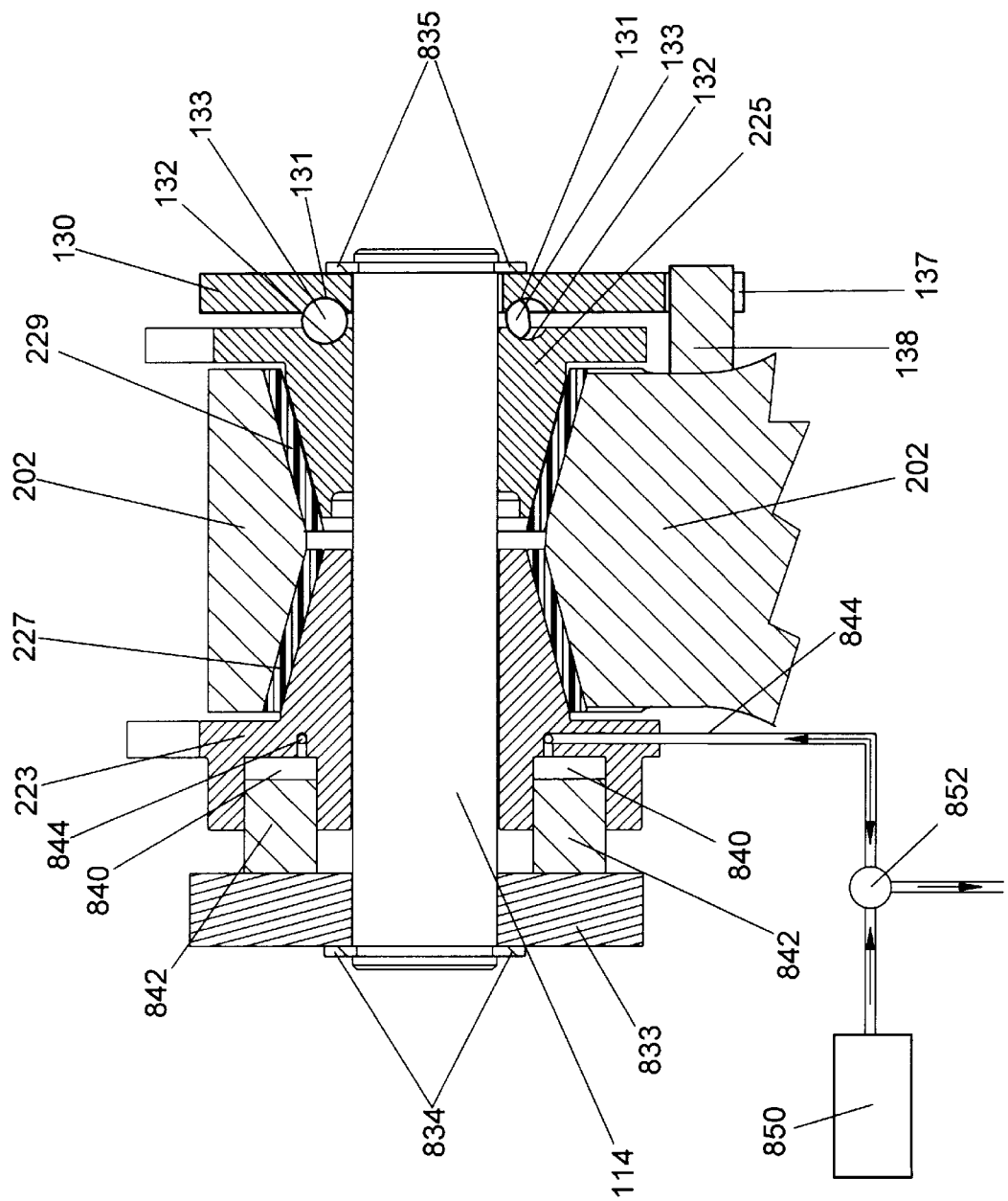
FIG. 6 shows a cross-sectional view of a joint assembly according to the present invention employing brake cones, friction cones, and hydraulic pistons/cylinders.

An alternative embodiment of the present invention employing hydraulic means to compress the bearing disc, brake cones, and friction cones against the bore of joint body 202 is shown in cross-section in FIG. 6. Shaft 114 is provided with retaining rings 834 and 835. Retaining plate 833 is positioned around shaft 114 between retaining ring 834 and brake cone 223. Plate 833 may comprise a portion of one of the joined members adapted to engage the joint assembly, or may be a component of the joint assembly. Brake cone 223 is provided with a plurality of hydraulic cylinders 840, each of which contains a hydraulic piston 842. Hydraulic cylinders 840 are connected to a common source of hydraulic fluid 850 via pressure regulating valve 852 and hydraulic fluid channels 844. As hydraulic fluid flow through channels 844 into cylinders 840, pistons 842 are forced outward from cylinders 840 and against plate 833, thereby compressing brake cones 223 and 225, friction cones 227 and 229, and bearing disc 130 between plate 833 and retaining ring 835. The configuration and operation of bearing disc 130, bearing grooves 131 and 132, bearings 133, slot 137, and lug 138 are substantially as described hereinabove.

The embodiment of FIG. 6 offers advantages over the other disclosed embodiments. The increased braking torque which arises from large rotation of the joint assembly may in some instances cause the joint to seize, or bind, at a position far from the rest position. This is clearly undesirable, and a mechanism for relieving an increased braking torque would allow the joint to return to its rest position following the arrest of a large motion by the increased brake torque. The pressure regulating valve 852 offers such a mechanism. Pressure regulating valves typically operate by allowing excess hydraulic pressure to "bleed off" through the valve. The bleed-off rate can be controlled, and by choosing an appropriate bleed-off rate, the desired behavior of the joint can be achieved. The bleed-off rate must be sufficiently slow so that when a large motion of the joint occurs, the action of the bearing disc and bearing grooves yields an increased braking torque as described above, and also causes an abrupt increase in the hydraulic pressure. Once the large rotation has been damped, or arrested, the bleed-off of hydraulic pressure through valve 852 toward its resting value allows the increased braking torque to decrease toward its resting value, thereby releasing the joint to return to its resting position. The hydraulic supply rate of hydraulic source 850 and the bleed-off rate of valve 852 both may be adjusted to yield the desired braking torque dynamical behavior. A pressure sensor and/or flow sensor in hydraulic supply line 844 may also be employed as a position and/or velocity sensor for the joint assembly.

In an alternative embodiment of the present invention, any type of rolling bearing may be employed, and the transverse (i.e., radial) cross-sectional profile of the bearing grooves may be any shape suitable for guiding the motion of the particular type of rolling bearing in use. A joint assembly according to the present invention may employ means for confining rolling bearings during assembly of the joint, such as a retaining plate or disc. Without departing from inventive concepts disclosed and/or claimed herein, any type of bearing may be employed for varying the pushing force/braking torque as the joint rotates from its rest position. For example, such bearings may include, but are not limited to, rolling bearings, cam-like bearings having an arbitrary profile, wedge-like bearings, sliding inclined plane type bearings, gear-like bearings, functional equivalents thereof, and/or combinations thereof. The mating surfaces of the brake members and friction member may be fabricated with complimentary shapes which tend to push them apart when the joint moves, thereby increasing the braking torque. The brake members and friction member may therefore also serve as the bearing member for varying the braking torque. Without departing from inventive concepts disclosed and/or claimed herein, the bearing assembly may be employed to produce any desired braking torque versus joint position desired, whether increasing torque with increasing joint motion, decreasing braking torque with increasing joint motion, or any arbitrary combination of the two.

In an alternative embodiment of the present invention, any mechanical means may be employed to compress the bearing disc, brake members, friction members, and joint body. Such mechanical means may include but are not limited to: hydraulic means, pneumatic means, levers, cams, push rods, pistons, nuts, screws, threads, clamps, retaining means on the shaft, functional equivalents thereof, and/or combinations thereof. The retaining means may include but are not limited to: a pin, a retaining ring, a snap ring, a radial flange, functional equivalents thereof, and/or combinations thereof. In an alternative embodiment of the present invention the compressing means may further comprise any means for transmitting compressive forces to the bearing disc and/or brake members, including but not limited to: substantially rigid spacers, thrust bearings of any type, belleville springs, coil springs, leaf springs, elastomeric springs, hydraulic springs, pneumatic springs, functional equivalents thereof, and/or combinations thereof.

The examples disclosed have comprised joint assemblies wherein pairs of brake/friction members are compressed on opposite faces of a joint body. However, without departing from inventive concepts disclosed and/or claimed herein, any joint assembly comprising a first brake member, a second brake member rotatable relative to the first brake member, a friction member positioned between the two brake members, and means for pushing the brake members into frictional engagement with the friction member may employ one or more bearing assemblies as disclosed herein for producing braking torque which varies with joint position. In an alternative embodiment of the present invention, the same component may serve as both the friction member and one of the brake members.

The present invention has been set forth in the forms of its preferred and alternative embodiments. It is nevertheless intended that modifications to the disclosed braked mechanical joint assemblies may be made without departing from inventive concepts disclosed and/or claimed herein.

What is claimed is:

1. A braked mechanical joint assembly for rotatably connecting a first joined member and a second joined member, the joint assembly comprising:
    a joint body connected to the first joined member and having first and second opposing faces and a bore connecting the opposing faces and defining a rotation axis; and
    a rotation assembly substantially nonrotatably engaged with the second joined member and rotatable about the rotation axis, the rotation assembly comprising
        a shaft positioned coaxially within the bore in the joint body and having a first end and a second end,
        a first friction member positioned against at least one of the bore and the first face of the joint body,
        a second friction member positioned against at least one of the bore and the second face of the joint body,
        a first brake member having means for substantially nonrotatably engaging the second joined member and positioned against the first friction member,
        a second brake member having means for substantially nonrotatably engaging the second joined member and positioned against the second friction member, and
        means for compressing the first and second friction members and the joint body between the first and second brake members, thereby frictionally engaging the joint body and the first brake member with the first friction member and the joint body and the second brake member with the second friction member and generating a braking torque opposing rotation about the rotation axis of the first and second brake members and the second joined member engaged therewith relative to the joint body; and
    a bearing assembly for further compressing the first and second friction members and the joint body between the first and second brake members during movement of the joint assembly substantially away from a resting joint position, thereby increasing the braking torque during movement of the joint assembly away from the resting joint position,
    wherein the resting joint position remains substantially fixed during movement of the joint assembly.

2. A joint assembly as recited in claim 1, wherein:
    the bearing assembly comprises a first bearing groove provided on the compressing means, a second bearing groove provided on the first brake member and mating with the first bearing groove, and a plurality of rolling bearings engaged within the first bearing groove and the second bearing groove;
    movement of the joint substantially away from the resting joint position results in relative motion of the first bearing groove and the second bearing groove and rolling of the bearings therein; and
    at least one of the first bearing groove and the second bearing groove has a varying depth profile, so that movement of the joint assembly substantially away from the resting joint position and rolling of the bearings within the bearing grooves further compresses the first friction member, the second friction member, and the joint body between the first brake member and the second brake member, thereby increasing the braking torque.

3. A joint assembly as recited in claim 2, wherein:
    at least one of the first bearing groove and the second bearing groove has a deepest groove segment corresponding to each of the plurality of bearings and intervening shallow groove segments;
    each of the bearings rests in the corresponding deepest groove segment when the joint is in the resting joint position; and
    each of the bearings rolls from the corresponding deepest groove segment to an adjacent shallow groove segment upon movement of the joint assembly substantially away from the resting joint position, thereby further compressing the first friction member, the second friction member, and the joint body between the first brake member and the second brake member and increasing the braking torque.

4. A joint assembly as recited in claim 3, wherein the rolling bearings are ball bearings.

5. A joint assembly as recited in claim 3, wherein the first and second bearing grooves are substantially circular, positioned substantially perpendicular to the rotation axis, and substantially concentric about the rotation axis.

6. A joint assembly as recited in claim 3, wherein each deepest groove segment has a flat-bottomed V-shaped profile and each intervening shallow groove segment has a substantially constant depth.

7. A joint assembly as recited in claim 3, wherein the bearing assembly comprises at least three bearings and at least three corresponding deepest groove segments.

8. A joint assembly as recited in claim 3, wherein:
    the compressing means comprises a first retainer positioned at the first end of the shaft, a second retainer positioned at the second end of the shaft, and at least one hydraulic cylinder in the second brake member containing a hydraulic piston; and
    flow of hydraulic fluid into the hydraulic cylinder pushes the piston against the first retainer, thereby compressing the first friction member, the second friction member, and the joint body between the first brake member and the second brake member and increasing the braking torque.

9. A joint assembly as recited in claim 8, further comprising a hydraulic regulating valve for setting a hydraulic pressure in the hydraulic cylinder and having a variable bleed-off rate, wherein:

setting the hydraulic pressure determines the braking torque in the resting joint position;

the bleed-off rate is sufficiently slow that movement of the joint substantially away from the resting joint position results in transiently increased hydraulic pressure and transiently increased braking torque; and bleed-off of hydraulic pressure allows the transiently increased hydraulic pressure to decrease and the transiently increased braking torque to decrease.

10. A joint assembly as recited in claim 3, wherein: the compressing means comprises a retainer at the first end of the shaft, threads on the second end of the shaft, and a threaded nut engaged on the second end of the shaft; and wherein tightening of the nut on the shaft compresses the first brake member, the first friction member, the joint body, the second friction member, and the second brake member between the retainer and the nut, thereby increasing the braking torque.

11. A joint assembly as recited in claim 3, wherein:

the compressing means comprises a retainer at the first end of the shaft, a cam-engaging pin positioned in a transverse hole through the second end of the shaft, and a cam positioned on the second end of the shaft and engaged with the cam-engaging pin; and rotation of the cam while engaged with the cam-engaging pin compresses the first brake member, the first friction member, the joint body, the second friction member, and the second brake member between the retainer and the cam, thereby increasing the braking torque.

12. A joint assembly as recited in claim 3, wherein:

the first friction member is a friction disc;

the second friction member is a friction disc;

the first brake member is a brake disc;

the second brake member is a brake disc;

the bearing assembly comprises a bearing disc substantially nonrotatably engaged with the joint body on which is positioned the first bearing groove; and the compressing means compresses the first brake disc, first and second friction discs, and joint body between the bearing disc and the second brake disc.

13. A joint assembly as recited in claim 3, wherein:

the bore comprises first and second coaxial right circular substantially frusto-conical sections each having a base, the bases of each of the frusto-conical sections coinciding with the opposing faces of the joint body;

the first friction member is a friction cone comprising an outer right circular substantially frusto-conical surface corresponding to the first frusto-conical section of the bore and an inner coaxial right circular substantially frusto-conical surface and positioned coaxially around the shaft against the first frusto-conical section of the bore;

the second friction member is a friction cone comprising an outer right circular substantially frusto-conical surface corresponding to the second frusto-conical section of the bore and an inner coaxial right circular substantially frusto-conical surface and positioned coaxially around the shaft against the second frusto-conical section of the bore;

the first brake member is a brake cone comprising a right circular substantially frusto-conical section corresponding to the inner surface of the first friction member, a base, and an axial bore for receiving the shaft, and is positioned coaxially around the shaft against the inner surface of the first friction member;

the second brake member is a brake cone comprising a right circular substantially frusto-conical section corresponding to the inner surface of the second friction member, a base, and an axial bore for receiving the shaft, and is positioned coaxially around the shaft against the inner surface of the second friction member; and the bearing assembly comprises a bearing disc substantially nonrotatably engaged with the joint body on which is positioned the first bearing groove; and the compressing means compresses the first brake cone, first and second friction cones, and joint body between the bearing disc and the second brake cone.

* * * * *